(12) United States Patent
Ito et al.

(10) Patent No.: US 11,167,788 B2
(45) Date of Patent: Nov. 9, 2021

(54) ELECTRIC POWER STEERING DEVICE

(71) Applicant: HONDA MOTOR CO., LTD., Tokyo (JP)

(72) Inventors: Soichiro Ito, Wako (JP); Norio Yamazaki, Wako (JP); Toshihiro Yoda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 500 days.

(21) Appl. No.: 16/201,214

(22) Filed: Nov. 27, 2018

(65) Prior Publication Data

US 2019/0161112 A1 May 30, 2019

(30) Foreign Application Priority Data

Nov. 29, 2017 (JP) .............................. JP2017-229332

(51) Int. Cl.
   *B62D 6/00* (2006.01)
   *B62D 5/04* (2006.01)
   *B62D 15/02* (2006.01)

(52) U.S. Cl.
   CPC ......... *B62D 5/0463* (2013.01); *B62D 5/0421* (2013.01); *B62D 5/0442* (2013.01); *B62D 5/0481* (2013.01); *B62D 6/00* (2013.01); *B62D 6/002* (2013.01); *B62D 15/0235* (2013.01)

(58) Field of Classification Search
   CPC .... B62D 1/286; B62D 15/025; B62D 5/0463; B62D 5/0472; B62D 6/002; B62D 6/02; B62D 15/0235; B62D 5/046; B60W 2050/0077
   USPC .............................. 701/41–42; 180/443, 422
   See application file for complete search history.

(56) References Cited

U.S. PATENT DOCUMENTS

| 4,830,127 | A | * | 5/1989 | Ito .......................... B62D 6/008 180/446 |
| 5,198,981 | A | * | 3/1993 | Collier-Hallman ......................... B62D 5/0463 180/446 |
| 5,996,724 | A | * | 12/1999 | Shimizu ................... B62D 6/00 180/446 |

(Continued)

FOREIGN PATENT DOCUMENTS

| CN | 106218710 A | 12/2016 |
| JP | 2012-162210 A | 8/2012 |
| JP | 2015-042527 A | 3/2015 |

OTHER PUBLICATIONS

Non-conduct steering sensor for electric power steering; W Xiaoling, Z Yan, W Hong—2009 International Conference on Information and Automation, Jun. 22-25, 2009—ieeexplore.IEEE.org (Year: 2009).*

(Continued)

*Primary Examiner* — Cuong H Nguyen
(74) *Attorney, Agent, or Firm* — Carrier Blackman & Associates, P.C.; Joseph P. Carrier; Jeffrey T. Gedeon

(57) ABSTRACT

Even in the case that the steered wheels are turned by an actual turning angle due to a disturbance from the road surface, and the steering shaft, which is mechanically connected to the steered wheels, attempts to rotate, a command current to an assist motor is set so that the actual turning angle becomes a corrected target turning angle. The force (torque) that attempts to cause rotation of the steering shaft due to the disturbance input from the road surface is instantaneously canceled by the assist motor.

7 Claims, 6 Drawing Sheets

(56) References Cited

U.S. PATENT DOCUMENTS

| | | | | |
|---|---|---|---|---|
| 6,705,424 | B2* | 3/2004 | Ogawa | B62D 1/163 180/444 |
| 7,295,907 | B2* | 11/2007 | Lu | B62D 15/0235 116/31 |
| 7,398,854 | B2* | 7/2008 | Heilig | B62D 5/0484 180/446 |
| 7,546,896 | B2* | 6/2009 | Furusho | B62D 5/0463 180/446 |
| 7,555,402 | B2* | 6/2009 | Barthomeuf | B62D 15/0235 180/402 |
| 7,596,441 | B2* | 9/2009 | Yokota | B62D 5/046 180/410 |
| 7,676,309 | B2* | 3/2010 | Tamaki | B62D 6/008 701/41 |
| 7,860,624 | B2* | 12/2010 | Kubota | B62D 5/0463 701/41 |
| 8,086,374 | B2* | 12/2011 | Yamaguchi | B62D 5/008 701/42 |
| 8,306,698 | B2* | 11/2012 | Suzuki | B62D 5/0475 701/41 |
| 8,594,892 | B2* | 11/2013 | Fujimoto | B62D 5/0463 701/42 |
| 8,775,025 | B2* | 7/2014 | Yamaguchi | B62D 5/046 701/41 |
| 8,874,316 | B2* | 10/2014 | Kariatsumari | B62D 5/046 701/41 |
| 8,977,437 | B2* | 3/2015 | Tamaizumi | B62D 7/159 701/42 |
| 2009/0069979 | A1* | 3/2009 | Yamashita | B62D 5/0463 701/42 |
| 2012/0199414 | A1 | 8/2012 | Shimizu et al. | |
| 2014/0081524 | A1* | 3/2014 | Tamaizumi | B62D 7/159 701/42 |
| 2015/0057889 | A1 | 2/2015 | Tamaizumi et al. | |

OTHER PUBLICATIONS

EPS Current Tracking Method Research Based on Hybrid Sensitivity Control Algorithm; H Wu, GXu, J Wu, X Han, J Feng, S Liu . . . —Journal of Electrical and Computer Engineering, 2018—hindawi.com (Year: 2018).*

Abstract of "Study on parameters affecting steering feel of column assist electric power steering"; Y Li, T Shim, D Wang, T Offerle—International Journal of Vehicle Design, vol. 77, Issue 3; DOI: 10.1504/IJVD.2018.0989412018—inderscienceonline.com (Year: 2018).*

Abstract of "A Control Strategy to Reduce Torque Oscillation of the Electric Power Steering System"; D Fu, S Rakheja, WJ Yan, WB Shangguan—Jun. 5, 2019—sae.org (Year: 2019).*

X. Wang, L. Guo and Y. Jia, "Online Sensing of Human Steering Intervention Torque for Autonomous Driving Actuation Systems," in IEEE Sensors Journal, vol. 18, No. 8, pp. 3444-3453, 15 Apr. 15, 2018, doi: 10.1109/JSEN.2018.2805381. (year: 2018).*

Steering feel improvement by mathematical modeling of the Electric Power Steering system. Jung Hyun Choi, Kanghyun Nam, Sehoon Oh; Mechatronics vol. 78, Oct. 2021, 102629 (year: 2021).*

Electric power steering: an overview of dynamics equation and how it's developed for large vehicle; N Nazaruddin, F Zainuri, R Siregar et al—iopscience.iop.org (N Nazaruddin etal 2019 IOP Conf. Ser.: Mater. Sci. Eng. 673 012112) (year: 2019).*

Office Action dated Dec. 10, 2020 issued over the corresponding Chinese Patent Application No. 201811445361.1 with the English translation of the pertinent portion.

Office Action dated Jun. 4, 2019 issued over the corresponding Japanese Patent Application No. 2017-229332 with the English translation thereof.

* cited by examiner

[FIRST EXEMPLARY EMBODIMENT]

[SECOND EXEMPLARY EMBODIMENT]

ELECTRIC POWER STEERING DEVICE

CROSS-REFERENCE TO RELATED APPLICATION

This application is based upon and claims the benefit of priority from Japanese Patent Application No. 2017-229332 filed on Nov. 29, 2017, the contents of which are incorporated herein by reference.

BACKGROUND OF THE INVENTION

Field of the Invention

The present invention relates to an electric power steering device which, upon manual operation of a steering wheel (steering operating element), grants an assist torque by a motor to thereby reduce the steering torque (steering wheel torque) during a steering operation.

Description of the Related Art

For example, in the electric power steering device disclosed in Japanese Laid-Open Patent Publication No. 2012-162210 (hereinafter referred to as JPA2012-162210), there is detected by a torque sensor a steering torque generated in a steering shaft by manual operation of a steering wheel, which is connected to the steered wheels from the steering wheel via the steering shaft, a pinion shaft, and a rack shaft.

Furthermore, a configuration is provided in which an assist torque is generated in a motor in a manner so that the detected steering torque temporarily becomes zero (refer to claim 1 of JPA2012-162210).

SUMMARY OF THE INVENTION

In the electric power steering device disclosed in JPA2012-162210, it is possible to lightly change the turning angle of the steered wheels of the vehicle in accordance with steering of a driver who operates the steering wheel.

However, in the electric power steering device disclosed in JPA2012-162210, since the steering wheel is mechanically connected to the steered wheels through a so-called steering mechanism (the steering wheel, the steering shaft, the pinion shaft, and the rack shaft), during traveling, in the case that a disturbance is input through the steered wheels from the road surface that causes the rack shaft to move, due to the fact that the pinion shaft rotates due to the movement of the rack shaft, the steering shaft rotates, which ultimately causes the steering wheel connected to the steering shaft to rotate.

In this manner, with the electric power steering device according to JPA2012-162210, in the case that a disturbance from the road surface is input to the steered wheels, the steering wheel undergoes rotation by an amount corresponding to the movement of the rack shaft with no relation to any operation by the driver, and therefore, a sense of discomfort is imparted to the driver who is grasping the steering wheel.

The present invention has been devised taking into consideration such a problem, and has the object of providing an electric power steering device which, even in the case that a disturbance that attempts to move the rack shaft is input from the road surface through the steered wheels during traveling, suppresses rotation of the steering shaft or the pinion shaft, and thereby prevents the steering wheel from being rotated.

An electric power steering device according to the present invention comprises:

a steering mechanism including a steering operating element, and a steering shaft, a pinion shaft, and a rack shaft that mechanically connect the steering operating element and a steered wheel;

a turning angle sensor adapted to detect an actual turning angle of the steered wheel;

a torque sensor adapted to detect an actual steering torque generated in the steering shaft;

an assist motor adapted to add an assist torque with respect to the steering mechanism; and a command current setting unit adapted to determine a target turning angle of the steered wheel based on the actual turning angle and the actual steering torque, and to set a command current to the assist motor in a manner so that the actual turning angle becomes the target turning angle.

According to the present invention, the target turning angle of the steered wheels is determined on the basis of the actual turning angle and the actual steering torque, and the command current that is supplied to the assist motor is set so that the actual turning angle coincides with the target turning angle.

Therefore, even in the case that the steered wheels are turned by the disturbance from the road surface during traveling, the actual turning angle is controlled so as to coincide with the target turning angle. Consequently, the force (torque) that attempts to cause rotation of the steering shaft due to the disturbance input from the road surface is instantaneously canceled.

Stated otherwise, since the disturbance from the road surface is suppressed so as not to reach the steering operating element through the steering shaft, it is possible for the driver to realize a steering feeling (a sense of steering comfort and handling) with high robustness.

In this case, the turning angle sensor adapted to detect the actual turning angle of the steered wheel may be a rotation angle sensor adapted to detect an actual angle of rotation of a main shaft of the assist motor.

In addition, the command current setting unit may further comprise a normative steering force determination unit adapted to determine a normative steering force in accordance with an actual steering angle, which is calculated on the basis of the actual turning angle and the actual steering torque, and a vehicle velocity, and may correct the target turning angle depending on a deviation between the normative steering force and the actual steering torque (or an actual steering force corresponding to the actual steering torque), and may generate a corrected target turning angle, together with setting the command current in a manner so that the actual turning angle becomes the corrected target turning angle.

In the electric power steering device having such a configuration, when the steering operating element is operated, an accurate steering feeling can be obtained corresponding to the actual steering angle and the actual steering torque pertaining to operation of the steering operating element and the vehicle velocity.

In this case, the command current setting unit may correct the target turning angle by causing a time differential component of the deviation between the normative steering force and the actual steering torque (or the actual steering force) to be reflected in the target turning angle, and may generate the corrected target turning angle.

In accordance with such a correction, for example, vibration of the steering operating element at the start of steering can be suppressed, and the steering feeling is improved.

Furthermore, when setting the command current to the assist motor in a manner so that the actual turning angle becomes the target turning angle under a feedback control, the command current setting unit may set the command current by applying the deviation between the actual steering torque (or the actual steering force) and the normative steering force to a proportional component of the feedback control.

According to this aspect of the present invention, convergence of the feedback control is rapidly implemented, and the steering feeling is further improved.

Further still, the command current setting unit may further comprise a normative steering force determination unit adapted to determine a normative steering force in accordance with an actual steering angle, which is calculated on the basis of the actual turning angle and the actual steering torque, and a vehicle velocity, and a normative steering force increasing/decreasing unit adapted to estimate a road surface condition depending on the actual steering torque, the rotational speed of the assist motor, and an actual current of the assist motor, increase or decrease the normative steering force in accordance with the estimated road surface condition, and generate a corrected normative steering force. The command current setting unit may correct the target turning angle depending on a deviation between the corrected normative steering force and the actual steering torque, and may generate a corrected target turning angle, together with setting the command current in a manner so that the actual turning angle becomes the corrected target turning angle.

According to this aspect of the present invention, it is possible to obtain a steering feeling in accordance with the state of the road surface, and hence the steering feeling is improved.

Further still, the command current setting unit may correct the target turning angle by causing a time differential component of the deviation between the corrected normative steering force and the actual steering torque (or the actual steering force) to be reflected in the target turning angle, and may generate the corrected target turning angle.

In accordance with such a correction, for example, vibration of the steering operating element at the start of steering can be suppressed, and the steering feeling is improved.

Further still, when setting the command current to the assist motor in a manner so that the actual turning angle becomes the corrected target turning angle under a feedback control, the command current setting unit may set the command current by applying the deviation between the corrected normative steering force and the actual steering torque (or the actual steering force) to a proportional component of the feedback control.

According to this aspect of the present invention, convergence of the feedback control is rapidly implemented, and the steering feeling is further improved.

According to the present invention, since the disturbance which is input to the steered wheels from the road surface is suppressed so as not to reach the steering operating element through the steering shaft, it is possible for the driver to realize a steering feeling (a sense of steering comfort and handling) with high robustness.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
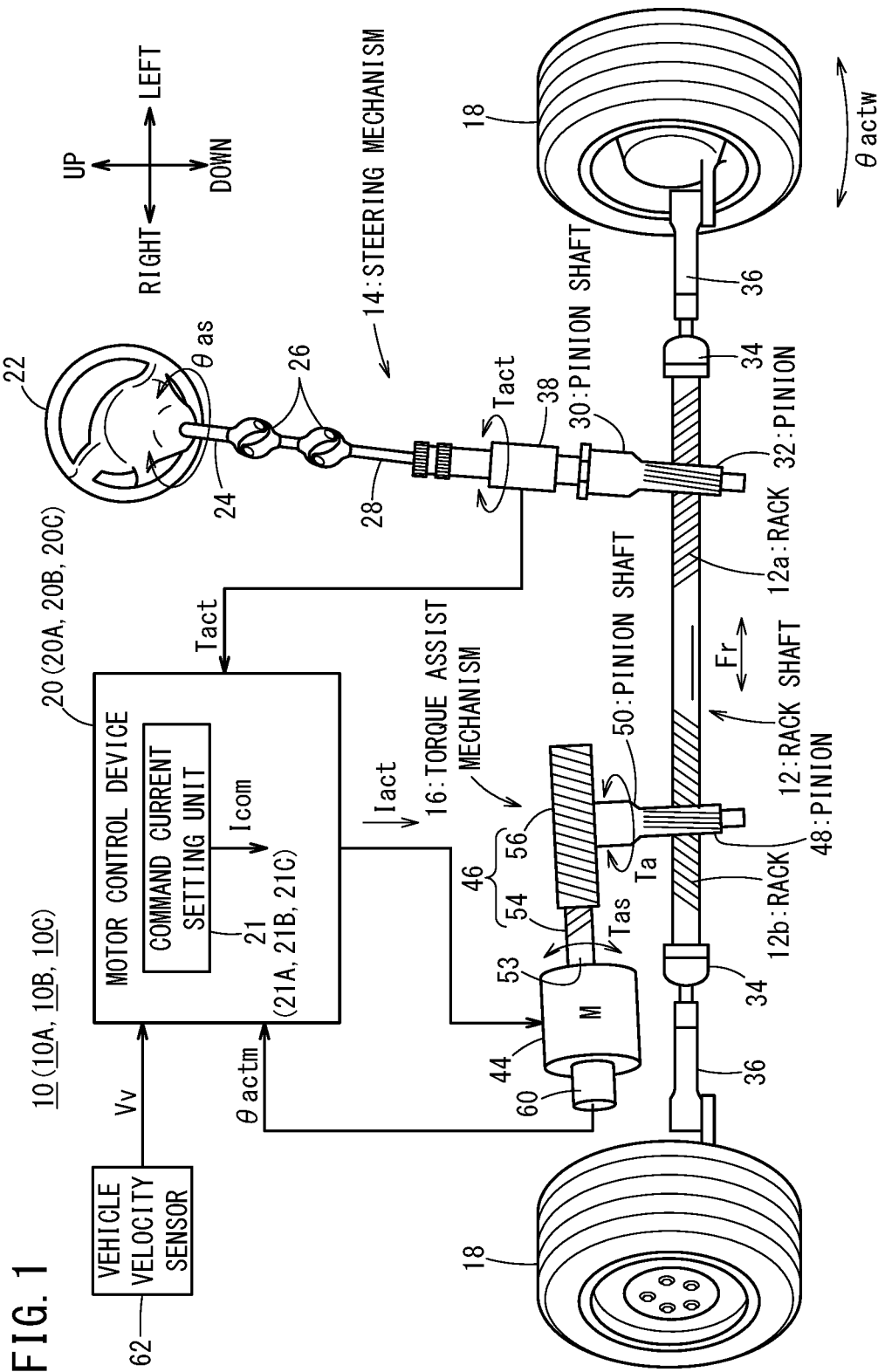
FIG. 1 is a schematic configuration diagram of an electric power steering device according to an embodiment of the present invention.

FIG. 1 is a schematic configuration diagram of an electric power steering device 10 according to an embodiment of the present invention.

In FIG. 1, "up and down" with the arrows shown in the upper right corner indicate the vertical direction of the vehicle (vertical upper and lower directions), and "left and right" with the arrows indicate the widthwise direction (lateral direction) of the vehicle.

The electric power steering device 10 is a so-called dual pinion type of electric power steering device, which basically comprises a steering mechanism 14 having a rack shaft 12 extending in the lateral direction, a torque assist mechanism 16 arranged on one end side of the rack shaft 12, steered wheels 18 which are the left and right front wheels, a motor control device (also referred to simply as a control device) 20, and a motor (assist motor) 44 for assisting a drive control performed by the motor control device 20.

The motor control device 20 is configured, for example, as an ECU (Electronic Control Unit). The ECU is a computational device including a microcomputer, and having a CPU, a memory, input/output devices such as an A/D converter, a D/A converter, and the like, and a timer serving as a timekeeping unit, etc., and the CPU functions as various function realizing units by reading in and executing programs stored in the memory.

The embodiment of the electric power steering device according to the present invention is not limited to being a dual pinion type as shown in the drawings, but can be applied to any appropriate system such as a column assist type, a belt drive type, or the like.

The steering mechanism 14, in addition to the rack shaft 12, includes a steering wheel 22 as a steering operating element which is operated (steered) by a driver, a steering shaft 24 that rotates in left and right directions by operation of the steering wheel 22, a pair of universal joints 26, and a pinion shaft 30, which is disposed below the steering shaft 24 via an intermediate shaft 28 (regarded as part of the steering shaft), and to which a steering force from the steering wheel 22 is transmitted.

The steering mechanism 14 is further equipped with the rack shaft 12 on which a rack 12a is formed that is meshed with a pinion 32 of the pinion shaft 30, and a torque sensor 38 which detects a torque, that is, an actual steering torque Tact, which is applied to the steering shaft 24 by the driver.

The steered wheels 18 are respectively connected to both ends along the axial direction of the rack shaft 12 via universal joints 34 and tie rods 36.

When the driver operates the steering wheel 22, the steering force thereof is transmitted to the rack shaft 12, the rack shaft 12 is displaced to the left or right along the vehicle widthwise direction, and the steered wheels 18 are turned. Stated otherwise, the steering mechanism 14 mechanically connects the steering wheel 22, which constitutes part of the steering mechanism 14, and the steered wheels 18.

On the other hand, the torque assist mechanism 16 includes the rack shaft 12, an assist motor 44, a worm gear mechanism 46, and a pinion shaft 50 formed with a pinion 48 that is enmeshed with a rack 12b of the rack shaft 12.

The worm gear mechanism 46, although rendered integrally in FIG. 1, is equipped with a worm 54, which is connected to a main shaft 53 of the assist motor 44, and a worm wheel 56 that is enmeshed with the worm 54.

The worm wheel 56 is pivotally mounted on the pinion shaft 50. The worm gear mechanism 46 functions as a speed reduction mechanism, the rotational motion transmitted from the assist motor 44 is decelerated, and the rotational motion of the decelerated pinion shaft 50 is transmitted to the steering shaft 24 via the rack shaft 12 and the pinion shaft 30.

In the torque assist mechanism 16, a command current setting unit 21 of the motor control device 20 sets a command current Icom in accordance with the actual steering torque Tact detected by the torque sensor 38, and the assist motor 44 is driven and controlled by a motor actual current Iact, which is feedback controlled so as to coincide with the command current Icom.

An assist torque Tas, which is generated by the assist motor 44 in accordance with the motor actual current Iact, is transmitted with respect to the rack shaft 12 via the worm gear mechanism 46 and the pinion shaft 50, as an assist torque Ta (assist force) with respect to the steering force of the driver (a value that can be calculated from the actual steering torque Tact) that is applied to the steering wheel 22.

The assist force and the steering force of the steering wheel 22 by the driver are combined to result in a rack axial force Fr that causes displacement of the rack shaft 12, and the rack axial force Fr turns the steered wheels 18.

In the present embodiment, a torsion bar type of torque sensor is used as the torque sensor 38 provided on the pinion shaft 30 of the steering mechanism 14, however, any appropriate torque sensor such as a magnetostrictive type of sensor or the like can be used.

On the assist motor 44, a resolver (rotation sensor) 60 is provided that detects a motor actual rotation angle θactm as a rotational position of the main shaft 53 of the assist motor 44. Other than the resolver 60, a rotary encoder or the like can be used as a rotation sensor which is capable of being attached to the assist motor 44.

[Configuration and Operations of Command Current Setting Unit 21]

Figure 2:
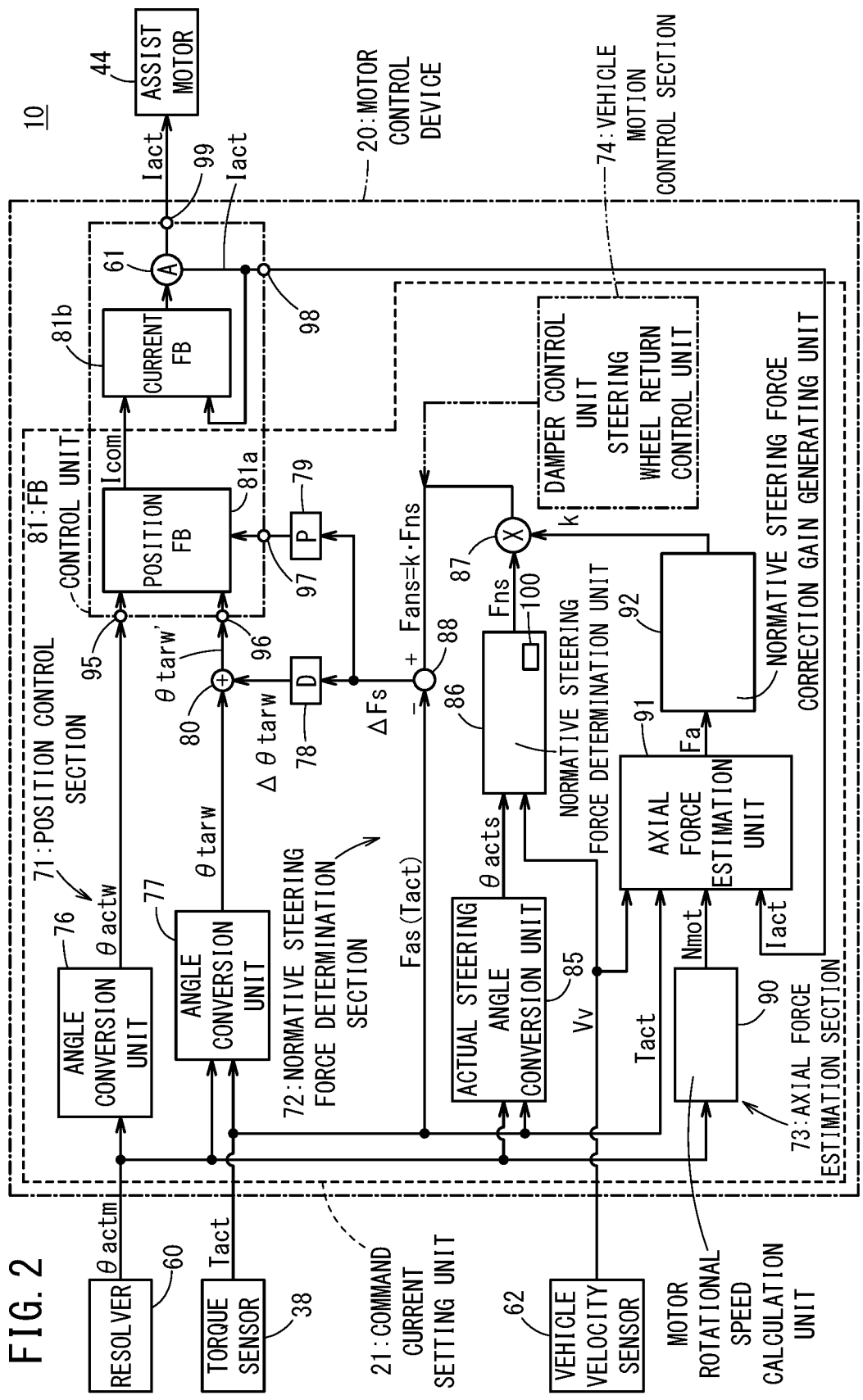
FIG. 2 is a schematic circuit block diagram of the electric power steering device, including a detailed configuration of a command current setting unit shown in FIG. 1.

FIG. 2 is a schematic circuit block diagram of the electric power steering device 10, including a detailed configuration of the command current setting unit 21 in accordance with being a principal component of the present invention.

Hereinafter, the configurations and operations of the command current setting unit 21 and the motor control device 20 will be described with reference to FIG. 2.

The command current setting unit 21 is generally constituted from a position control section 71, a normative steering force determination section 72, and an axial force estimation section 73.

The position control section 71 is constituted from angle conversion units 76 and 77, a differentiator 78, a proportional device 79, an adder 80, and a feedback (FB) control unit 81.

The normative steering force determination section 72 is constituted from an actual steering angle conversion unit 85, a normative steering force determination unit 86, a multiplier 87, and a subtracter 88.

The axial force estimation section 73 is constituted from a motor rotational speed calculation unit 90, an axial force estimation unit 91, and a normative steering force correction gain generating unit 92.

The position control section 71, the normative steering force determination section 72, and the axial force estimation section 73 are functional units concerned with a so-called steering wheel torque control, which optimizes the response of the steering wheel 22 and improves the sense of steering comfort and handling.

Since it does not make up a principal component of the present invention, it will only be described schematically, however, a vehicle motion control section 74, which is surrounded by the two-dot dashed line, may also be provided. The vehicle motion control section 74 is constituted from a damper control unit (input signals thereto are the motor rotational speed Nmot and the actual steering torque Tact) for improving the convergence of the vehicle, and a steering wheel return control unit (input signals thereto are the actual steering torque Tact and an actual steering angle θacts) for controlling a returning condition of the steering wheel, and each of the output signals therefrom (a damper steering force, and a steering wheel returning force) may be added to a corrected normative steering force Fans.

With respect to the command current setting unit 21 of the motor control device 20 which is configured as described above, inputs are made thereto from respective sensors, namely, a motor actual rotational angle θactm is input from the resolver 60, the actual steering torque Tact is input from the torque sensor 38, and furthermore, the motor actual current Iact is input from a current sensor 61 through a terminal 98, the current sensor 61 being inserted in an input terminal of the assist motor 44. The current sensor 61 is incorporated in the motor control device 20, and more specifically, in the feedback (FB) control unit 81.

In the position control section 71, the motor actual rotational angle θactm of the main shaft 53 of the assist motor 44, which is detected by the resolver 60, is converted in the angle conversion unit 76 into an actual turning angle θactw of the steered wheels 18.

Due to the fact that the main shaft 53 of the assist motor 44 and the steered wheels 18 are mechanically connected via the worm gear mechanism 46, the pinion shaft 50, the pinion 48, the rack shaft 12 (rack 12b), the universal joints 34, and the tie rods 36, the motor actual rotational angle θactm of the main shaft 53 is in a proportional relationship which is predetermined generally with respect to the actual turning angle θactw of the steered wheels 18. Based on this relationship, the motor actual rotational angle θactm is converted in the angle conversion unit 76 into the actual turning angle θactw. The relationship is stored in advance in the memory of the motor control device 20.

The actual turning angle θactw, which is converted in the one angle conversion unit 76, is input from the angle conversion unit 76 to a comparison input terminal 95 of the position feedback (FB) control unit 81a.

From the actual steering torque Tact detected by the torque sensor 38, the other angle conversion unit 77 estimates a torsional angle, which is a twisting amount of the torque sensor 38, by referring to a map (which is a correspondence table indicating values of the twisting amount of the torque sensor 38 about the steering shaft with respect to the actual steering torque Tact) that was measured in advance, calculates the target turning angle θtarw of the steered wheels 18 by adding an estimated turning angle of the steered wheels 18 that is estimated for a case where the pinion shaft 30 rotates by the estimated torsional angle to the actual turning angle θactw of the steered wheels 18, which is converted from the motor actual rotational angle θactm, and inputs the target turning angle θtarw to a reference input terminal 96 of the position feedback control unit 81a via one input terminal of the adder 80.

Furthermore, the actual steering torque Tact is input as an actual steering force Fas to a subtrahend input terminal of the subtracter 88.

The actual steering angle conversion unit 85 calculates the actual steering angle θacts of the steering wheel 22 by converting the motor actual rotational angle θactm from the resolver 60 into a rotation angle of the pinion shaft 50, converting the rotation angle of the pinion shaft 50 into a left-right displacement amount of the rack shaft 12 (12b, 12a), converting the left-right displacement amount of the rack shaft 12 into a rotation angle of the pinion shaft 30, adding the above-described torsional angle, which is estimated from the actual steering torque Tact of the torque sensor 38, to the rotational angle of the pinion shaft 30, and inputs the actual steering angle θacts to one input terminal of the normative steering force determination unit 86. The vehicle velocity Vv, which is detected by a vehicle velocity sensor 62, is input to the other input terminal of the normative steering force determination unit 86.

With the vehicle velocity Vv serving as a parameter with respect to the actual steering angle θacts, a normative steering force map 100 for optimizing the response to operations of the steering wheel as well as improving steering comfort and handling is stored in advance in the memory, and by referring to the normative steering force map 100 in the memory, the normative steering force determination unit 86 determines and inputs a normative steering force Fns [Nm] to one input terminal of the multiplier 87.

Figure 3:
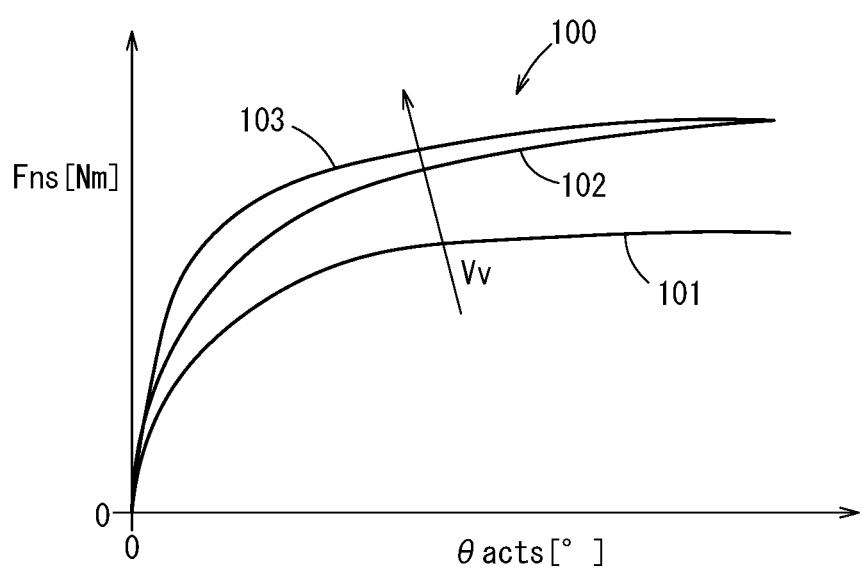
FIG. 3 is an explanatory diagram of an example of a normative steering force map.

FIG. 3 shows an exemplary normative steering force map 100, which is made up from a plurality of normative steering force maps 101, 102, and 103 with the vehicle velocity Vv serving as a parameter.

The normative steering force Fns is set to a zero value at a neutral position (θacts=0[°]) of the steering wheel 22, and within a region where the actual steering angle θacts is small, the normative steering force Fns is determined so as to sharply increase with respect to an increase in the angle, and when the angle exceeds a certain fixed actual steering angle θacts, the normative steering force Fns is determined so as to remain at a substantially constant value. Moreover, in general, the normative steering force Fns is determined so as to become larger as the vehicle velocity Vv becomes higher. Stated otherwise, in the case that the vehicle velocity Vv is high, the steering force (steering feeling) required for the driver to steer the steering wheel 22 is determined to be heavier than when the vehicle velocity Vv is low.

Referring again to FIG. 2, in the axial force estimation section 73, the motor rotational speed calculation unit 90 calculates the motor rotational speed Nmot on the basis of the motor actual rotational angle θactm input from the resolver 60, and inputs the motor rotational speed Nmot to the input terminal of the axial force estimation unit 91.

The actual motor current Iact is input from the current sensor 61 to another input terminal of the axial force estimation unit 91, and the actual steering torque Tact is input from the torque sensor 38, and furthermore, the vehicle velocity Vv is input from the vehicle velocity sensor 62 to yet other input terminals of the axial force estimation unit 91.

Based on the input motor rotational speed Nmot, the actual steering torque Tact, the motor actual current Iact, and the vehicle velocity Vv, the axial force estimation unit 91 estimates an axial force Fa required for estimating the road surface condition, and for correcting the normative steering force Fns, and inputs the estimated axial force Fa to the normative steering force correction gain generating unit 92.

In this case, the axial force Fa [Nm] is basically calculated by the sum of the actual steering torque Tact [Nm] corresponding to the steering force of the steering wheel 22 applied by the driver's hands, and a motor assist force [Nm] corresponding to the motor actual current Iact. The sum is corrected by the motor rotational speed Nmot in order to correct the steering wheel 22 at a time of turning back, and to correct an inertia component of the assist motor 44, whereby the axial force Fa [Nm] is calculated, and is input to the normative steering force correction gain generating unit 92.

By referring to the map, the normative steering force correction gain generating unit 92 generates a correction gain (correction coefficient) k with respect to the estimated axial force Fa, and inputs the correction gain k to the other input terminal of the multiplier 87.

In this case, for example, using the vehicle velocity Vv and the actual steering angle θacts as parameters, the axial force on a dry road surface is stored by experiment as a reference axial force (a relationship between the dry road surface and the reference axial force), and in the case that a coefficient of friction μ of the road surface is small with respect to such a relationship, the axial force Fa is estimated to be smaller than the reference axial force. In that case, the correction gain k is set in a manner so that the normative steering force Fns becomes smaller in conformity with the coefficient of friction μ of the road surface, and is corrected so as to result in the corrected normative steering force Fans on the basis of the coefficient of friction μ of the road surface.

More specifically, the multiplier 87 multiplies the normative steering force Fns by the correction gain k to thereby generate the corrected normative steering force (also referred to simply as a normative steering force) Fans (Fans=k·Fns), and inputs the corrected normative steering force Fans to a minuend input terminal of the subtracter 88.

The subtracter 88 generates a deviation ΔFs (ΔFs=Fans−Fas) between the normative steering force Fans and the actual steering force Fas, and inputs the deviation ΔFs to the differentiator 78 and the proportional device 79.

The differentiator 78 regards the time differentiated value of the deviation ΔFs as a correction target turning angle (target turning angle correction amount) Δθtarw, and inputs it to the other input terminal of the adder 80. Consequently, a corrected target turning angle θtarw' (θtarw'=θtarw+Δθtarw) is generated at the output of the adder 80, and is input to the reference input terminal 96 of the feedback control unit 81 (position feedback control unit 81a).

The proportional device 79 forms a force by causing the deviation ΔFs generated by the subtracter 88 to be influenced by a proportional component of an integral term of the feedback control, and inputs the force to the position feedback control unit 81a through a terminal 97.

The position feedback control unit 81a determines the command current Icom in a manner so that the actual turning angle θactw becomes the corrected target turning angle θtarw', and inputs the command current Icom to an input terminal of a current feedback control unit 81b.

The actual motor current Iact is input to a feedback input terminal of the current feedback control unit 81b, and the current feedback control unit 81b performs a feedback control so that the motor actual current Iact, which is input to the assist motor 44 through a terminal 99, becomes the command current Icom.

Consequently, the motor actual current Iact, which coincides with the command current Icom, flows to the assist motor 44.

As a result, even if a force (torque) is generated that attempts to rotate the steering shaft 24 due to a disturbance input from the road surface, such a force is instantaneously canceled by the motor torque generated by the assist motor 44, and it is possible for the driver to realize a steering feeling (a sense of steering comfort and handling) with high robustness.

Further, in the above-described embodiment, the actual turning angle θactw of the steered wheels 18 is detected (estimated) using the resolver 60, which forms a constituent element that is essential to the rotation control of the assist motor 44. Since the steered wheels 18 are mechanically connected to the main shaft 53 of the assist motor 44, the actual turning angle θactw can be detected by the resolver 60 which serves as a rotation angle sensor for detecting the motor actual rotational angle θactm of the main shaft 53. The resolver 60 is a constituent element that is essential to the control of the assist motor 44, and therefore, no increase in cost occurs.

Of course, in order to detect the actual turning angle θactw of the steered wheels 18, the present embodiment can also be implemented using a displacement sensor that detects displacement of the rack shaft 12, or a toe angle sensor that detects a toe angle of the steered wheels 18.

Development of Embodiment

In the above embodiment, although a so-called best mode thereof has been described, the embodiment can be implemented by any one of the first through third exemplary embodiments to be described below.

First Exemplary Embodiment

Figure 4:
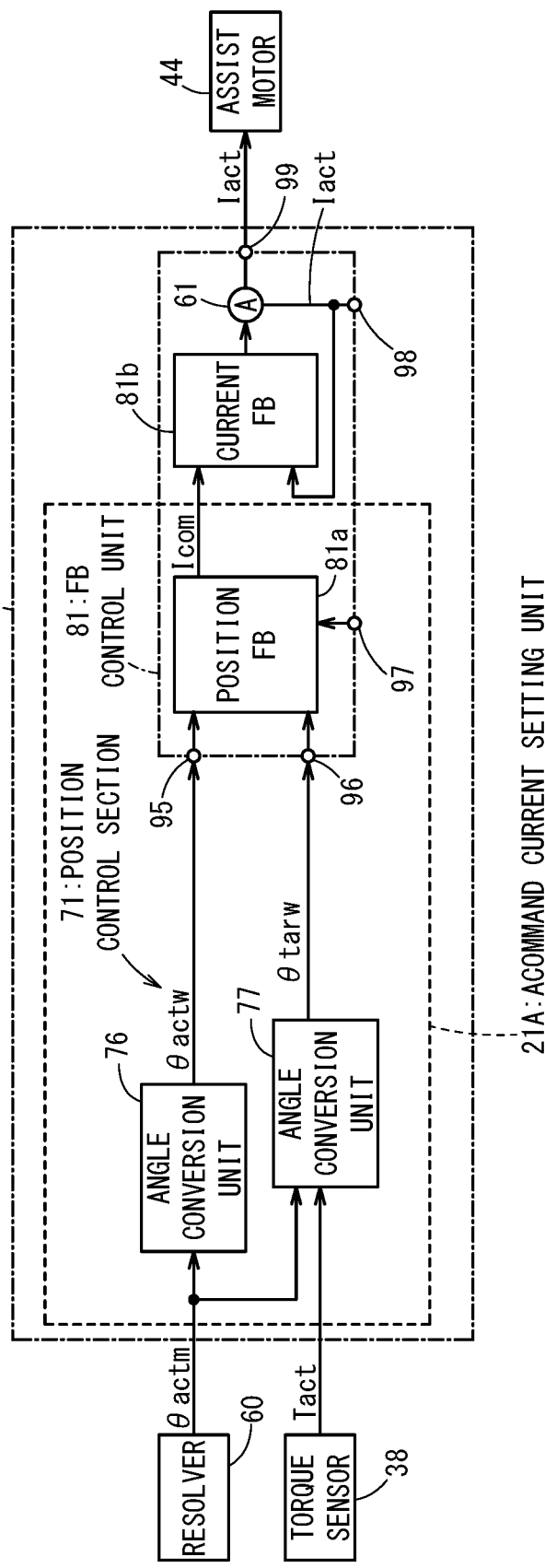
FIG. 4 is a schematic circuit block diagram of the electric power steering device according to a first exemplary embodiment.

FIG. 4 is a schematic circuit block diagram of an electric power steering device 10A according to a first exemplary embodiment.

The electric power steering device 10A according to the first exemplary embodiment is equipped with a motor control device 20A including a command current setting unit 21A.

More specifically, in the electric power steering device 10A according to the first exemplary embodiment, the normative steering force determination section 72, the axial force estimation section 73, and the vehicle motion control section 74 are eliminated from the electric power steering device 10 according to the embodiment shown in FIG. 2, and a configuration is provided in which only the position control section 71 is set in an operational state.

As shown in FIGS. 1 and 4, the electric power steering device 10A according to the first exemplary embodiment is equipped with the steering mechanism 14 (including the steering wheel 22 as a steering operating element, and the steering shaft 24, the pinion shaft 30, and the rack shaft 12 that mechanically connect the steering wheel 22 and the steered wheels 18), the resolver 60 as a turning angle sensor that detects the actual turning angle θactw of the steered wheels 18, the torque sensor 38 that detects the actual steering torque Tact generated in the steering shaft 24, the assist motor 44 that adds the assist torque Ta corresponding to the assist torque Tas with respect to the steering mechanism 14, and the command current setting unit 21A that determines the target turning angle θtarw of the steered wheels 18 based on the actual turning angle θactw and the actual steering torque Tact, and sets the command current Icom to the assist motor 44 during the feedback control in a manner so that the actual turning angle θactw becomes the target turning angle θtarw.

According to the first exemplary embodiment, the target turning angle θtarw of the steered wheels 18 is determined on the basis of the actual turning angle θactw and the actual steering torque Tact, and the command current Icom that is supplied to the assist motor 44 is set so that the actual turning angle θactw is set to (coincide with) the target turning angle θtarw.

Therefore, during traveling, in the case that the steered wheels 18 are turned by an actual turning angle θactw due to a disturbance from the road surface, and the steering shaft 24, which is mechanically connected to the steered wheels 18, attempts to rotate, in actuality, when the steering wheel 22 is not operated and the actual steering torque Tact is a zero value, the command current Icom to the assist motor 44 is set so as to maintain such a zero value. The assist motor 44 is rotated by the target turning angle θtarw, which cancels the actual turning angle θactw, in accordance with the motor torque that is instantaneously generated by the actual motor current Iact corresponding to the command current Icom. Consequently, the force (torque) that attempts to cause rotation of the steering shaft 24 due to the disturbance input from the road surface is instantaneously canceled without being transmitted to the steering shaft 24.

Stated otherwise, the disturbance that is input to the steered wheels 18 from the road surface is controlled so as not to reach the torque sensor 38. Therefore, since the disturbance from the road surface is suppressed so as not to reach the steering wheel 22 through the rack shaft 12, the pinion shaft 30, and the steering shaft 24, it is possible for the driver to realize a steering feeling (a sense of steering comfort and handling) with high robustness.

Second Exemplary Embodiment

Figure 5:
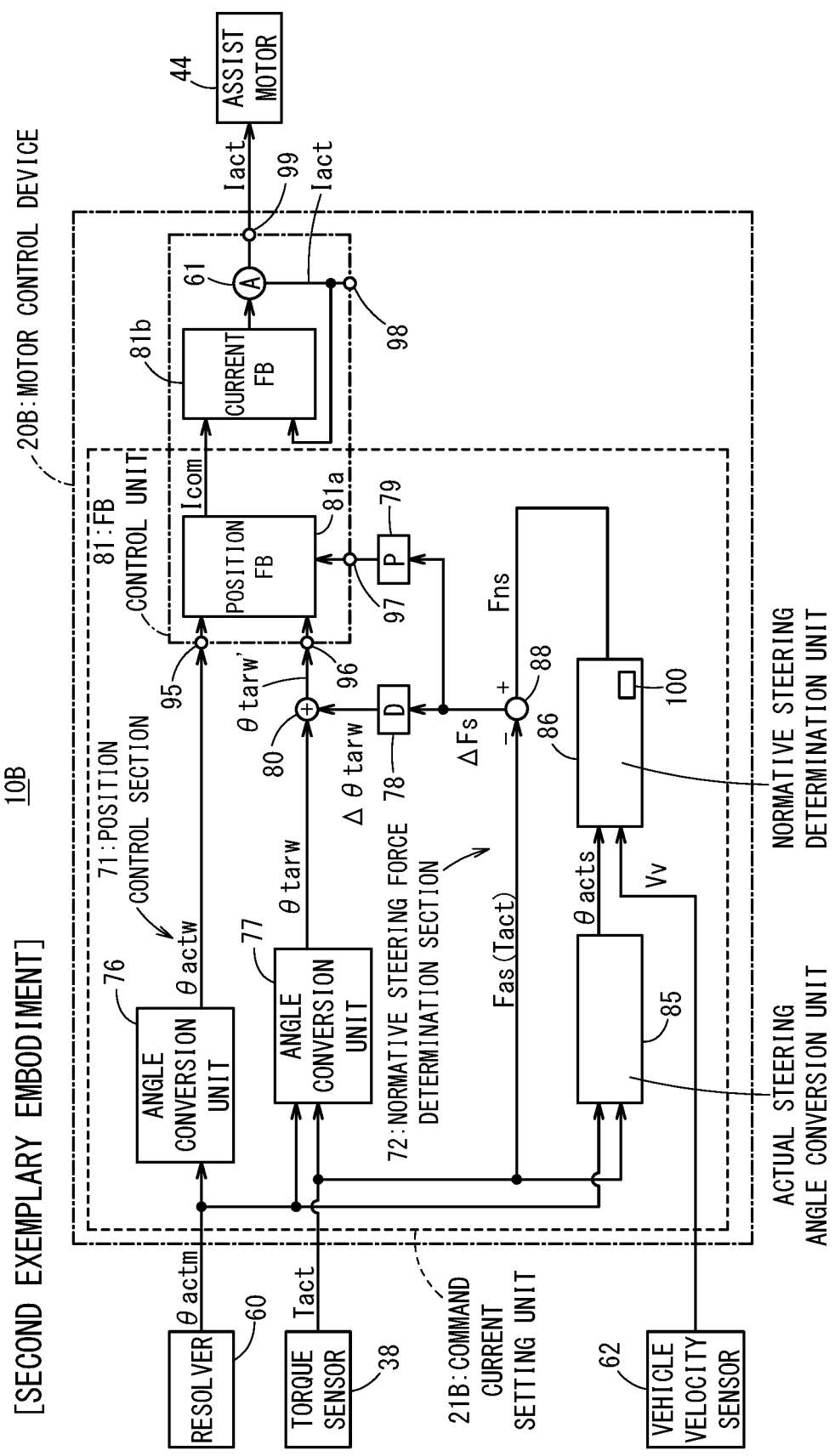
FIG. 5 is a schematic circuit block diagram of the electric power steering device according to a second exemplary embodiment.

FIG. 5 is a schematic circuit block diagram of an electric power steering device 10B according to a second exemplary embodiment.

The electric power steering device 10B according to the second exemplary embodiment is equipped with a motor control device 20B including a command current setting unit 21B. More specifically, in the electric power steering device 10B according to the second exemplary embodiment, the axial force estimation section 73, and the vehicle motion control section 74 are eliminated from the electric power steering device 10 according to the first-described embodiment, and a configuration is provided in which the position control section 71 and the normative steering force determination section 72 are set in an operational state.

With reference to a normative steering force map 100 shown in FIG. 3, the normative steering force determination unit 86 determines a normative steering force Fns depending on the actual steering angle θacts and the vehicle velocity Vv.

In this case, the command current setting unit 21B corrects the target turning angle θtarw in accordance with a deviation ΔFs (ΔFs=Fns−Fas) between the normative steering force Fns and the actual steering force Fas corresponding to the actual steering torque Tact, and generates the corrected target turning angle θtarw' (θtarw'←θtarw+Δθtarw), together with setting the command current Icom in a manner so that the actual turning angle θactw becomes the corrected target turning angle θtarw'.

According to the second exemplary embodiment, in the electric power steering device 10B, an accurate steering feeling can be obtained corresponding to the actual steering angle θacts and the actual steering torque Tact pertaining to operation of the steering wheel 22, and the vehicle velocity Vv.

In this instance, when the corrected target turning angle θtarw' is generated by correcting the target turning angle θtarw in accordance with the deviation ΔFs between the normative steering force Fns and the actual steering force Fas, the command current setting unit 21B corrects the target turning angle θtarw by causing a time differential component (correction target turning angle Δθtarw) of the deviation ΔFs (ΔFs=Fns−Fas) between the actual steering force Fas and the normative steering force Fns to be reflected in the target turning angle θtarw, and generates the corrected target turning angle θtarw' (θtarw'=θtarw+Δθtarw).

Due to such a correction, for example, vibration of the steering wheel 22 at the start of steering can be suppressed.

Further, when setting the command current Icom to the assist motor 44 in a manner so that the actual turning angle θactw becomes the corrected target turning angle θtarw' by operation of the position feedback control unit 81a, the command current setting unit 21B may set the command current Icom by applying the deviation ΔFs between the actual steering force Fas and the normative steering force Fns to a proportional component of the position feedback control unit 81a through the proportional device 79.

In this case, convergence of the feedback control is rapidly implemented, and the steering feeling is further improved.

Third Exemplary Embodiment

Figure 6:
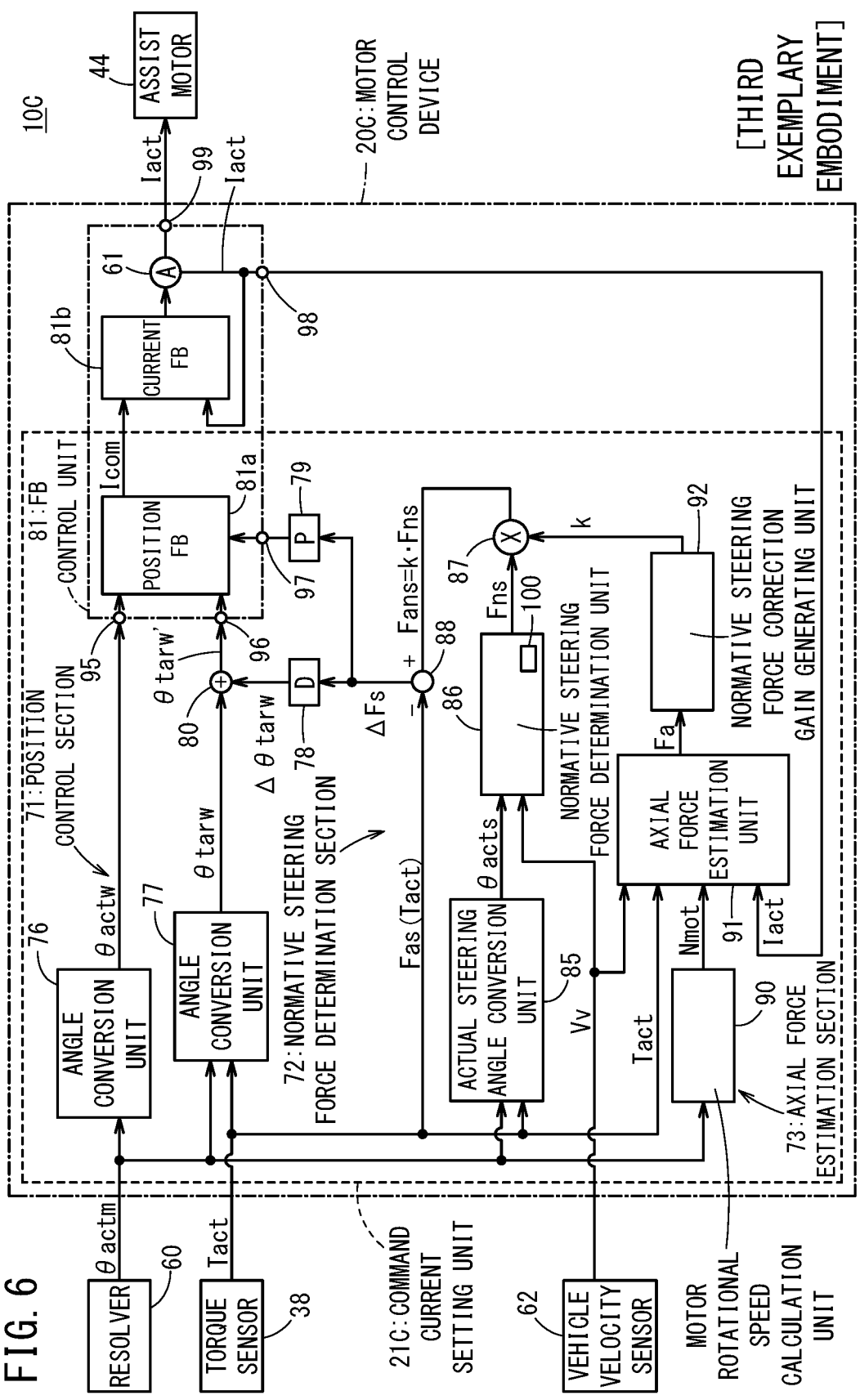
FIG. 6 is a schematic circuit block diagram of the electric power steering device according to a third exemplary embodiment.

FIG. 6 is a schematic circuit block diagram of an electric power steering device 10C according to a third exemplary embodiment.

The electric power steering device 10C according to the third exemplary embodiment is equipped with a motor control device 20C including a command current setting unit 21C. More specifically, the vehicle motion control section 74 is eliminated from the electric power steering device 10 according to the first-described embodiment (see FIG. 2), and a configuration is provided in which the position control section 71, the normative steering force determination section 72, and the axial force estimation section 73 are set in an operational state.

In the normative steering force determination section 72, the normative steering force determination unit 86 determines the normative steering force Fns depending on the actual steering angle θacts, which is calculated by the actual steering angle conversion unit 85 on the basis of the motor actual rotational angle θactm (or the actual turning angle θactw) and the actual steering torque Tact, and the vehicle velocity Vv.

In the axial force estimation section 73, which serves as a normative steering force increasing/decreasing unit, the axial force estimation unit 91 estimates the axial force Fa pertaining to the road surface condition, depending on the actual steering torque Tact, the motor rotational speed Nmot of the assist motor 44, the motor actual current Iact of the assist motor 44, and the vehicle velocity Vv, and in accordance with the estimated axial force Fa (road surface condition), the normative steering force increasing/decreasing unit (the normative steering force correction gain generating unit 92 and the multiplier 87) generates the corrected normative steering force Fans (k·Fns).

The position control section 71 corrects the target turning angle θtarw in accordance with the deviation ΔFs between the corrected normative steering force Fans (k·Fns) and the actual steering force Fas corresponding to the actual steering torque Tact, and generates the corrected target turning angle θtarw', together with setting the command current Icom in a manner so that the actual turning angle θactw becomes the corrected target turning angle θtarw'.

According to the third exemplary embodiment, a steering feeling can be obtained corresponding to the state of the road surface.

In this case, the command current setting unit 21C corrects the target turning angle θtarw by causing a time differential component (the target turning angle correction amount Δθtarw) of the deviation ΔFs between the corrected normative steering force Fans=k·Fns and the actual steering force Fas to be reflected in the target turning angle θtarw, and generates the corrected target turning angle θtarw'.

In accordance with such a correction, for example, vibration of the steering wheel 22 at the start of steering can be suppressed, and the steering feeling is improved.

In this case as well, when setting the command current Icom to the assist motor 44 in a manner so that the actual turning angle θactw becomes the corrected target turning angle θtarw' under a feedback control, the command current setting unit 21C sets the command current Icom by applying the deviation ΔFs between the corrected normative steering force Fans and the actual steering force Fas to a proportional component of the feedback control by the proportional device 79.

According to this aspect, convergence of the feedback control is rapidly implemented, and the steering feeling is further improved.

The present invention is not limited to the above-described embodiments, and various additional or alternative configurations could be adopted therein based on the descriptive content of the present specification.

What is claimed is:
1. An electric power steering device, comprising:
a steering mechanism including a steering operating element, and a steering shaft, a pinion shaft, and a rack shaft that mechanically connect the steering operating element and a steered wheel;
a torque sensor adapted to detect an actual steering torque generated in the steering shaft;
an assist motor adapted to add an assist torque with respect to the steering mechanism;
a rotation angle sensor adapted to detect an actual angle of rotation of a main shaft of the assist motor;

an angle conversion unit adapted to convert a motor actual rotational angle as the angle of rotation of a min shaft of the assist motor into an actual turning angle of the steered wheel; and a command current setting unit adapted to determine a target turning angle of the steered wheel by adding, to the actual turning angle of the steered wheel converted from the motor actual rotational angle, an estimated turning angle of the steered wheel that is estimated for a case where the pinion shaft rotates by a torsional angle of the torque sensor, the torsional angle being estimated based on the the actual steering torque, and to set a command current to the assist motor in a manner so that the actual turning angle becomes the target turning angle.

2. The electric power steering device according to claim 1, wherein:

the command current setting unit further comprises a normative steering force determination unit adapted to determine a normative steering force in accordance with an actual steering angle, which is calculated on the basis of the actual turning angle and the actual steering torque, and a vehicle velocity; and a normative steering force increasing/decreasing unit adapted to estimate a road surface condition depending on the actual steering torque, the rotational speed of the assist motor, and an actual current of the assist motor, increase or decrease the normative steering force in accordance with the estimated road surface condition, and generate a corrected normative steering force; and the command current setting unit corrects the target turning angle depending on a deviation between the corrected normative steering force and the actual steering torque, and generates a corrected target turning angle, together with setting the command current in a manner so that the actual turning angle becomes the corrected target turning angle.

3. The electric power steering device according to claim 1, wherein the command current setting unit:

further comprises a normative steering force determination unit adapted to determine a normative steering force in accordance with an actual steering angle, which is calculated on the basis of the motor actual rotational angle and the actual steering torque, and a vehicle velocity; and corrects the target turning angle depending on a deviation between the normative steering force and the actual steering torque, and generates a corrected target turning angle, together with setting the command current in a manner so that the actual turning angle becomes the corrected target turning angle.

4. The electric power steering device according to claim 3, wherein the command current setting unit corrects the target turning angle by causing a time differential component of the deviation between the normative steering force and the actual steering torque to be reflected in the target turning angle, and generates the corrected target turning angle.

5. The electric power steering device according to claim 4, wherein, when setting the command current to the assist motor in a manner so that the actual turning angle becomes the target turning angle under a feedback control, the command current setting unit sets the command current by applying the deviation between the actual steering torque and the normative steering force to a proportional component of the feedback control.

6. The electric power steering device according to claim 2, wherein, when setting the command current to the assist motor in a manner so that the actual turning angle becomes the corrected target turning angle under a feedback control, the command current setting unit sets the command current by applying the deviation between the corrected normative steering force and the actual steering torque to a proportional component of the feedback control.

7. The electric power steering device according to claim 2, wherein the command current setting unit corrects the target turning angle by causing a time differential component of the deviation between the corrected normative steering force and the actual steering torque to be reflected in the target turning angle, and generates the corrected target turning angle.

* * * * *